United States Patent [19]

Hiterer et al.

[11] Patent Number: 5,693,991
[45] Date of Patent: Dec. 2, 1997

[54] SYNCHRONOUS TWIN RECIPROCATING PISTON APPARATUS

[75] Inventors: Misha Hiterer, Jerusalem; Mark Kushnir, Rehovot, both of Israel

[73] Assignee: Medis El Ltd., Jerusalem, Israel

[21] Appl. No.: 599,206

[22] Filed: Feb. 9, 1996

[51] Int. Cl.$^6$ .......................... H02K 33/12; F04B 35/04; F25B 9/14

[52] U.S. Cl. ...................................... 310/30; 62/6

[58] Field of Search .................. 310/12, 13, 14, 310/30, 15, 17; 62/6; 250/332, 334; 60/520

[56] References Cited

U.S. PATENT DOCUMENTS

| | | | |
|---|---|---|---|
| 3,781,559 | 12/1973 | Cooper et al. | 250/334 |
| 3,851,173 | 11/1974 | Taylor et al. | 250/332 |
| 4,346,318 | 8/1982 | Shtrikman | 310/12 |
| 4,455,497 | 6/1984 | Shtrikman | 310/30 |
| 4,534,176 | 8/1985 | Horn et al. | 62/6 |
| 4,545,209 | 10/1985 | Young | 310/12 X |
| 4,610,143 | 9/1986 | Stolfi et al. | 62/6 |
| 4,629,920 | 12/1986 | Hermann | 310/156 |
| 4,713,939 | 12/1987 | Keith | 310/12 X |
| 5,099,158 | 3/1992 | Stuart et al. | 310/14 |

FOREIGN PATENT DOCUMENTS 0 620 367 A1  9/1994  European Pat. Off. .

OTHER PUBLICATIONS

"Linear Cryogenic Coolers, Theory of Operation and Application Notes", Hughes Aircraft Company, Electron Dynamics Division, pp. 2–5–2–9, No Publishing Information Given.

*Primary Examiner*—Steven L. Stephan
*Assistant Examiner*—Judson H. Jones
*Attorney, Agent, or Firm*—Mark M. Friedman

[57] ABSTRACT

A synchronous twin reciprocating piston apparatus includes a cylinder and a number of stator assemblies mounted in fixed relation thereto. The stator assemblies are constructed so as to generate a radial magnetic field in a number of regions near to each end of the cylinder. The apparatus also includes a pair of piston-magnet assemblies, each having a piston slidable within an end of the cylinder, and a number of compound permanent magnet systems located within the regions. Each compound permanent magnet system includes a first section magnetized in a direction radial relative to the cylinder axis and a second section, axially displaced from the first, magnetized in the opposite direction. When the stator assemblies are excited with an alternating current, the piston-magnet assemblies reciprocate axially relative to said cylinder, and synchronously with the frequency of the applied current. The pistons then generate a pulsating pressure within the cylinder.

12 Claims, 8 Drawing Sheets

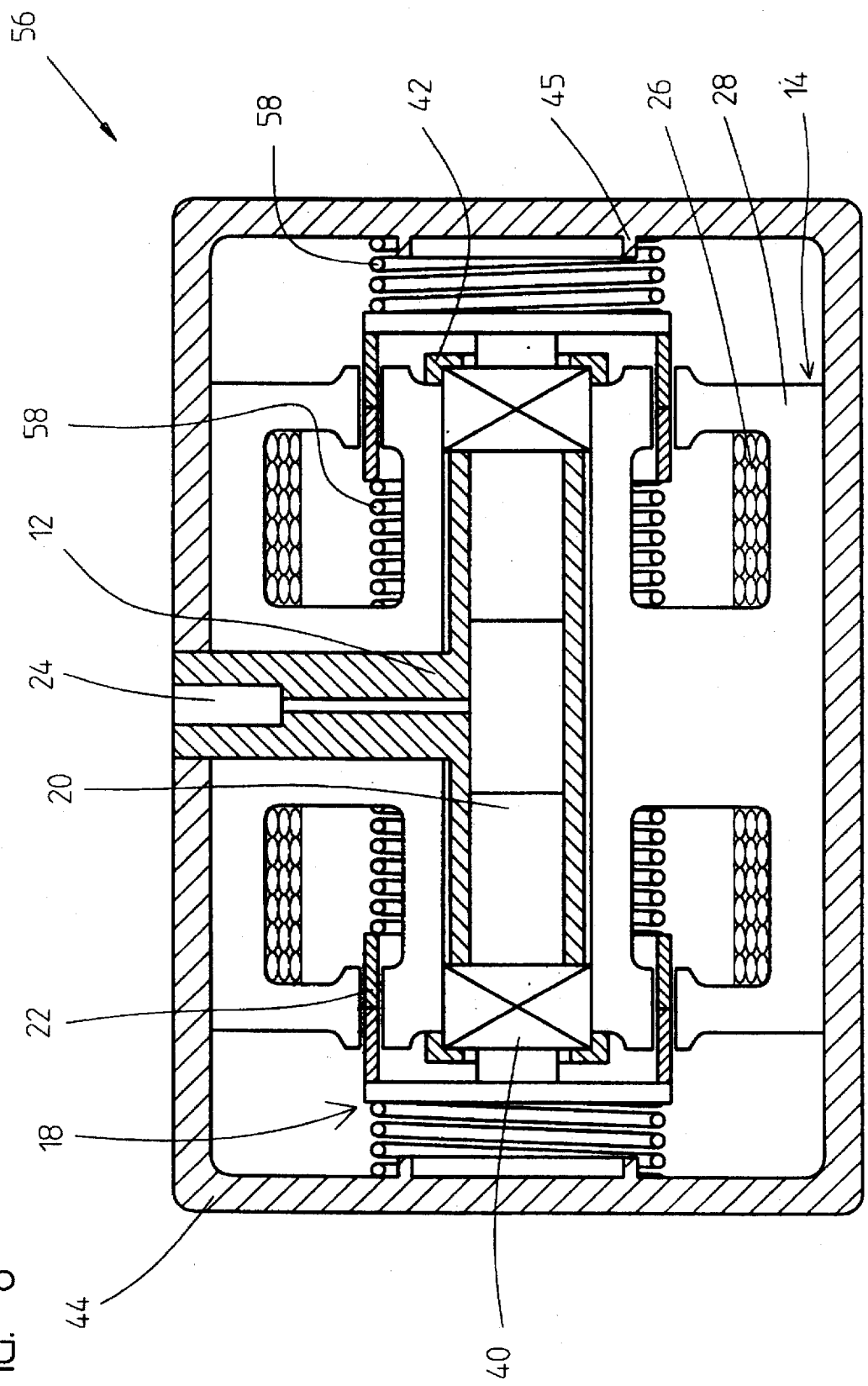

SYNCHRONOUS TWIN RECIPROCATING PISTON APPARATUS

FIELD AND BACKGROUND OF THE INVENTION

The present invention relates to compressors and pumps and, in particular, it concerns a synchronous twin reciprocating piston apparatus suitable for use as a compressor in a cryogenic cooling system.

It is known to use linear compressor having two opposing pistons to generate pulsating pressure for cryogenic cooling systems and the like. Typically, the pulsating pressure is employed to reciprocate a displacer piston in a Stirling cycle cooler. A compressor of this type is disclosed in European Patent Application No. 94/105,522 to Hughes Aircraft Co. (EP Publication No. 620,367). The prevalent design for the linear compressor is a "moving coil" design in which an alternating current is passed through a coil attached to each piston and mounted between the poles of a fixed permanent magnet. A "moving magnet" design in which the coil is fixed and the permanent magnet is attached to the piston is considered to yield equivalent results.

Known linear compressors, such as that of the above-referenced European Patent Application, are generally highly inefficient due to the leakage of a major proportion of the magnetic flux. The use of a single magnet piece further limits efficiency.

Permanent magnet electric motors of various types are known. These include conventional and linear motors, motors with a disk rotor such as are disclosed in U.S. Pat. No. 4,629,920, and reciprocating linear motors such as are disclosed in U.S. Pat. No. 4,346,318. These motors generally contain one or more pairs of magnet pieces, magnetized in opposing directions, positioned in a break in a magnetic circuit. This arrangement provides high efficiency by concentrating the magnetic flux of an A.C. coil around the magnet.

There is therefore a need for simple and highly efficient linear compressors and pumps which lack the deficiencies of the prior art devices.

SUMMARY OF THE INVENTION

The present invention is of a synchronous twin reciprocating piston apparatus suitable for use as a compressor in a cryogenic cooling system.

According to the teachings of the present invention there is provided, a synchronous twin reciprocating piston apparatus comprising: (a) a cylinder having a first end, a second end and a central axis; (b) at least one stator assembly mounted in fixed relation to the cylinder, the at least one stator assembly being constructed so as to generate a magnetic field in at least two regions, each of the magnetic fields being radial relative to, and symmetrical about, the axis; and (c) a pair of piston-magnet assemblies, each piston-magnet assembly including: (i) a piston slidable within one of the ends of the cylinder, and (ii) at least one compound permanent magnet system located within the regions and associated with the piston, each compound permanent magnet system including a first section magnetized in a direction radial relative to the axis and a second section axially displaced from the first section magnetized in a direction opposite to the first section, such that, when the at least one stator assembly is activated with an alternating current, the piston-magnet assemblies reciprocate axially relative to the cylinder.

According to a further feature of the present invention, the pistons generate pulsating pressure in an outlet connected to the cylinder.

According to a further feature of the present invention, the cylinder has an internal bore, the distance between the piston and the internal bore defining a first gap, the distance between the compound permanent magnet system and the stator defining a second gap, wherein the second gap is significantly greater than the first gap.

According to a further feature of the present invention, the second gap is at least about ten times greater than the first gap.

According to a further feature of the present invention, the compound permanent magnet system has a hollow cylindrical form coaxial with the piston.

According to a further feature of the present invention, the compound permanent magnet system is formed from a plurality of substantially planar magnets mounted together to form a substantially closed polygon.

According to a further feature of the present invention, the compound permanent magnet system includes: (a) a layer of magnetically conductive material having an inner surface and an outer surface; (b) a plurality of permanent magnets attached to the inner surface; and (c) a plurality of permanent magnets attached to the outer surface.

According to a further feature of the present invention, the layer is integrally formed with the piston.

According to a further feature of the present invention, there is also provided a magnetic compensation mechanism for modifying the magnetic fields so as to minimize frictional energy losses during operation of the apparatus.

According to a further feature of the present invention, the magnetic compensation mechanism includes at least one piece of soft magnetic material mounted at a variable distance from one of the compound permanent magnet systems.

According to a further feature of the present invention, the at least one stator assembly includes at least one adjustment coil, the magnetic compensation mechanism including means for selectively activating the at least one adjustment coil.

According to a further feature of the present invention, the at least one stator assembly includes: (a) a first coil for generating the magnetic field in a first of the at least two regions; (b) a second coil for generating the magnetic field in a second of the at least two regions; and (c) at least one connector for connecting an electrical potential across the first and second coils, the at least one connector being switchable so as to reverse selectively the polarity of the electrical potential connected across one of the first and second coils.

BRIEF DESCRIPTION OF THE DRAWINGS

The invention is herein described, by way of example only, with reference to the accompanying drawings, wherein:

FIG. 8 is a side cross-sectional view through a variant form of the apparatus of FIG. 1;

DESCRIPTION OF THE PREFERRED EMBODIMENTS

The present invention is of a synchronous twin reciprocating piston apparatus suitable for use as a compressor in a cryogenic cooling system.

The principles and operation of an apparatus according to the present invention may be better understood with reference to the drawings and the accompanying description.

By way of example, the synchronous twin reciprocating piston apparatus of the present invention will be illustrated with reference to a compressor for producing pulsating pressure with no net flow. This embodiment is suitable for driving a Stirling cycle cooler in a range of cooling applications as is known in the art. For convenience of reference, the apparatus of the invention will therefore be referred to as a "compressor". It should be noted, however, that the synchronous twin reciprocating piston apparatus of the present invention may equally be constructed as a pump or compressor in which a net fluid flow takes place, such as, for example, in a refrigerator. Such applications require only trivial modification of the embodiments described, as will be clear to one ordinarily skilled in the art.

Figure 1:
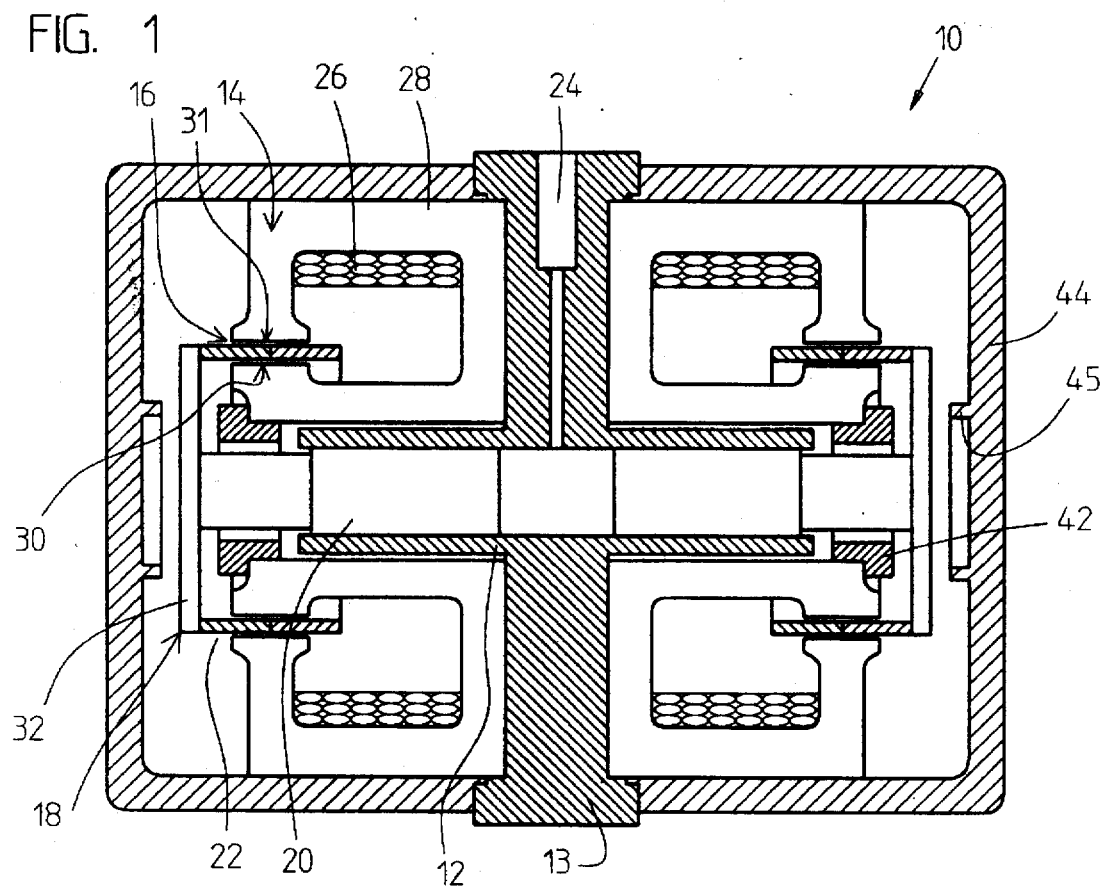
FIG. 1 is a side cross-sectional view through a synchronous twin reciprocating piston apparatus, constructed and operative according to the teachings of the present invention.

Referring now to the drawings, FIG. 1 shows a compressor, generally designated 10, constructed and operative according to the teachings of the present invention. In general terms, compressor 10 includes a cylinder 12, two identical stator assemblies 14 fixed relative to cylinder 12 for producing a concentrated alternating radial magnetic field in regions 16, and a pair of piston-magnet assemblies 18. Each piston-magnet assembly 18 includes a piston 20 slidable within part of cylinder 12 and a number of compound permanent magnet systems 22 located within regions 16. When stator assemblies 14 are excited by an alternating current, alternating axial forces are exerted on compound permanent magnet systems 22 thereby causing synchronous opposing reciprocation of pistons 20 within cylinder 12. The reciprocation of pistons 20 within cylinder 12 gives rise to oscillating pressure at the center of cylinder 12.

In the interests of clarity, it should be understood that the term "axial" as used herein in the specification and claims refers to a direction or dimension which is parallel to the central axis of cylinder 12. Similarly, the term "radial" is used herein in the specification and claims to refer to a direction or dimension perpendicular to this axis.

Although the present invention is described herein as a single cylinder structure, it may readily be adapted to a multiple cylinder system. A number of synchronous systems functioning in parallel may be connected at their outlets. Alternatively, a number of cylinders may be combined into a single unit with a plurality of angularly-spaced interconnected bores each receiving a pair of opposing pistons-magnet assemblies.

Turning now to the features of compressor 10 in more detail, cylinder 12 has an internal bore which is ground to high precision for receiving pistons 20. An outlet tube 24 is connected to the inner volume of cylinder 12 near its center. For pumping applications in which a net flow is required, an additional inlet tube and appropriately positioned valves (not shown) may be added.

It is an important feature of the compressors of the present invention that the cylinder 12, stator assemblies 14 and piston-magnet assemblies 18 are arranged precisely coaxially. To facilitate precise alignment of stator assemblies 14 relative to cylinder 12, compressor 10 features a radially extending flange 13 integrally formed with cylinder 12 at the center of its length.

Turning now to stator assemblies 14, each stator assembly includes at least one coil 26 and a core made up of one or more pairs of stator packs 28 arranged symmetrically about the axis of cylinder 12. Independent stator assemblies 14 are preferably provided for driving each piston-magnet assembly 18. Each stator assembly 14 is attached to flange 13. Alternatively, stator assembly 14 may extend along a major part of the length of cylinder 12 to provide regions 16 around both ends of cylinder 12, as will be illustrated below with reference to FIG. 8.

Figure 2:
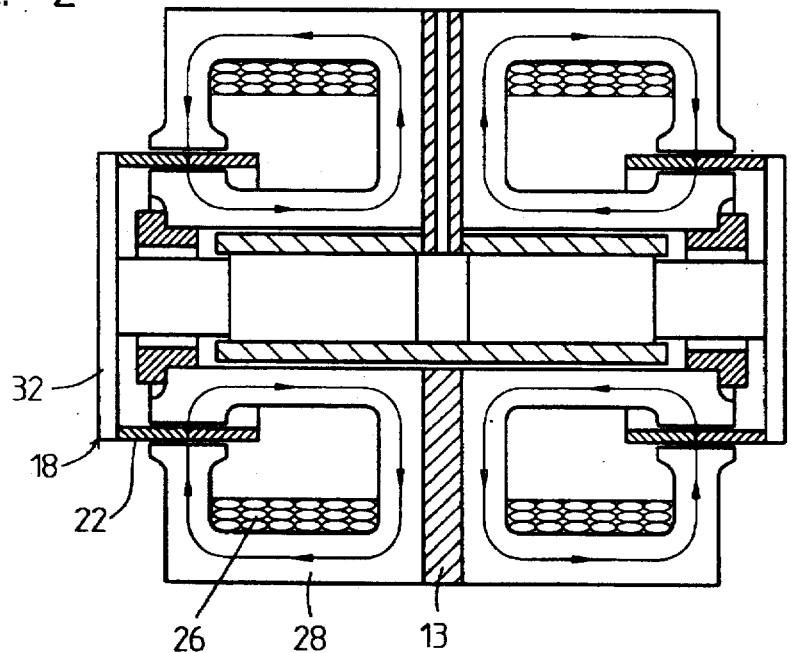
FIG. 2 is a schematic side cross-sectional view showing the magnetic flux patterns during operation of the apparatus of FIG. 1.

It is a particular feature of the present invention that stator assemblies 14 produce a substantially radial magnetic field pattern concentrated within regions 16. To achieve this result, stator packs 28 are generally shaped as substantially closed magnetic circuits which pass through coil 26. Regions 16 are defined by relatively narrow breaks in stator packs 28 formed between gap faces 30 and 31. The magnetic flux patterns corresponding to the view of FIG. 1 are shown in FIG. 2.

Figure 3A:
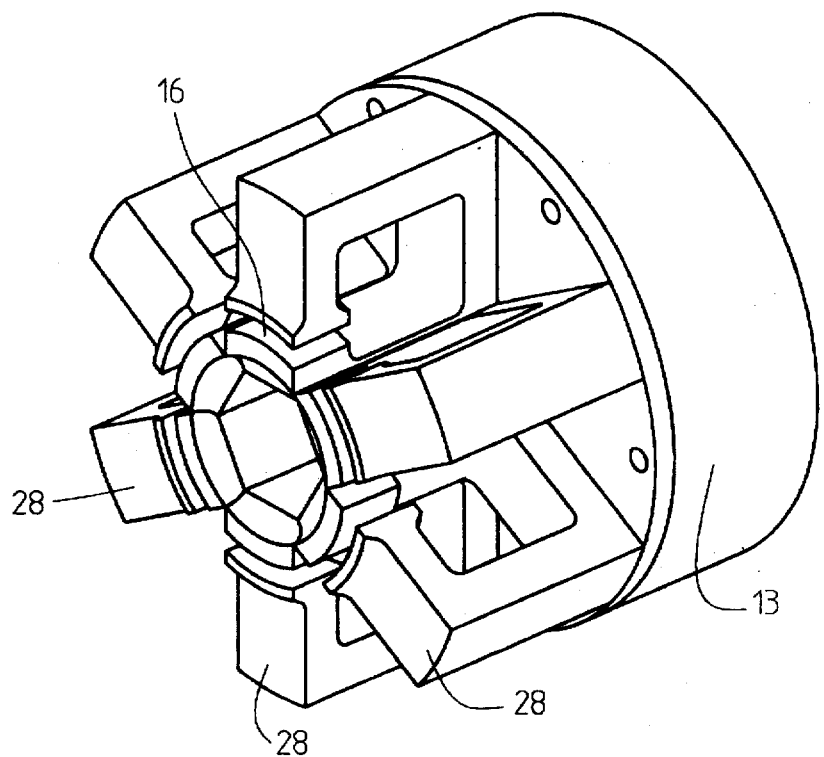
FIG. 3A is a schematic perspective view of a core of a stator assembly for use in the apparatus of FIG. 1.
Figure 3C:
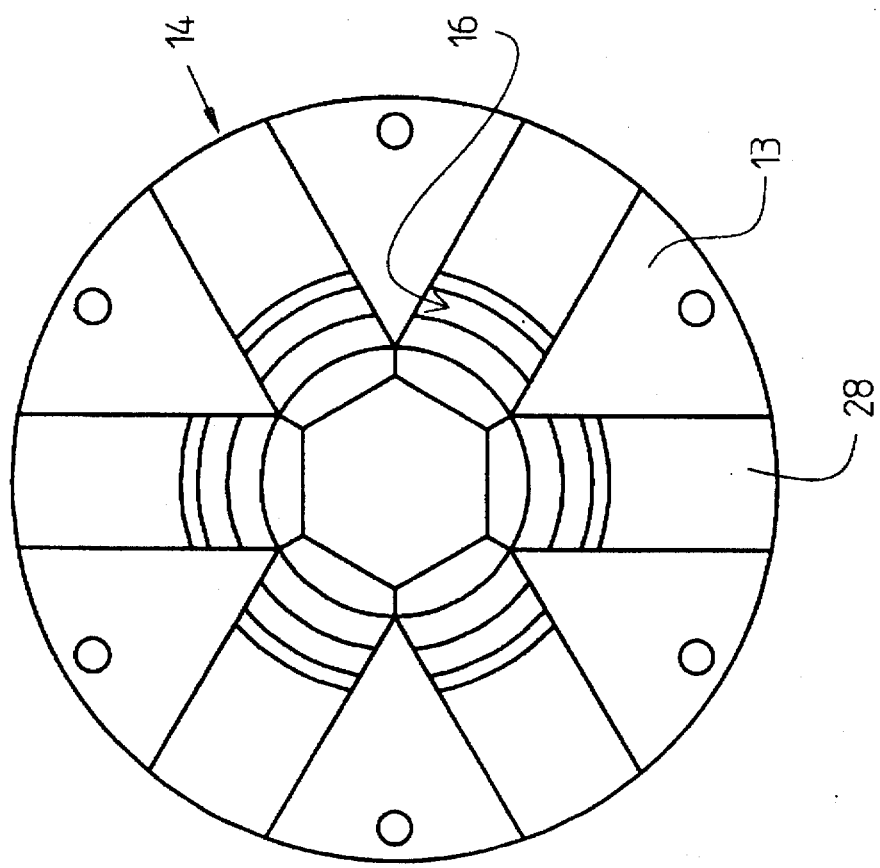
FIG. 3C is an end view of the stator core of FIG. 3A.
Figure 3B:
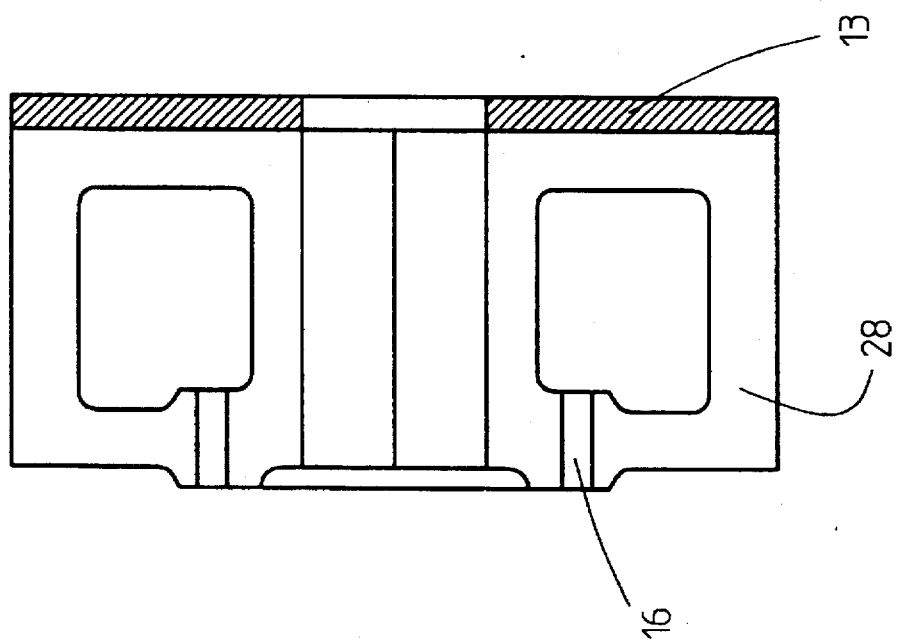
FIG. 3B is a side cross-sectional view through the stator core of FIG. 3A.

In a preferred embodiment, three pairs of stator packs 28 are arranged with hexagonal symmetry about the axis of cylinder 12, as shown in FIGS. 3A, 3B and 3C. Stator packs 28 are preferably constructed from a plurality of laminations parallel to the magnetic flux direction, thereby minimizing the magnetic losses.

Gap faces 30 and 31 are shaped to match the shape of compound permanent magnet systems 22. Thus, they are typically curved to match a cylindrical magnet design which will be described below with reference to FIG. 5A. Alternatively, parallel planar gap faces 30 and 31 may be used to match a polygon-structured compound permanent magnet system, as will be described below with reference to FIG. 5B.

Coils 26 and stator packs 28 are constructed to produce magnetic fields of equal magnitude, up to given tolerances, in each region 16. Thus, where separate coils 26 are used to generate the fields at the two ends of cylinder 12, similar coils of equal numbers of Ampere-turns are used. Similarly, stator packs 28 are designed and positioned symmetrically relative to both to rotation about the axis of cylinder 12, and reflection in a plane perpendicular thereto. In practice, the symmetry of the magnetic fields produced is limited by the tolerances of the components used. Mechanisms for compensating for distortion of the magnetic fields will be discussed below.

It is generally advantageous to provide independent and reversible connections (not shown) for connecting coils 26 to a power supply (not shown). This allows construction of piston-magnet assemblies 18 without requiring unique determination of the polarity of each magnet used. A polarity checking procedure may then be performed to determine whether the arrangement of magnets used generates the required opposing piston motion, and if necessary, the polarity of one of coils 26 may be reversed. The polarity checking procedure will be described below. It may also be desirable to enable switching between parallel and series connection of coils 26.

Figure 4A:
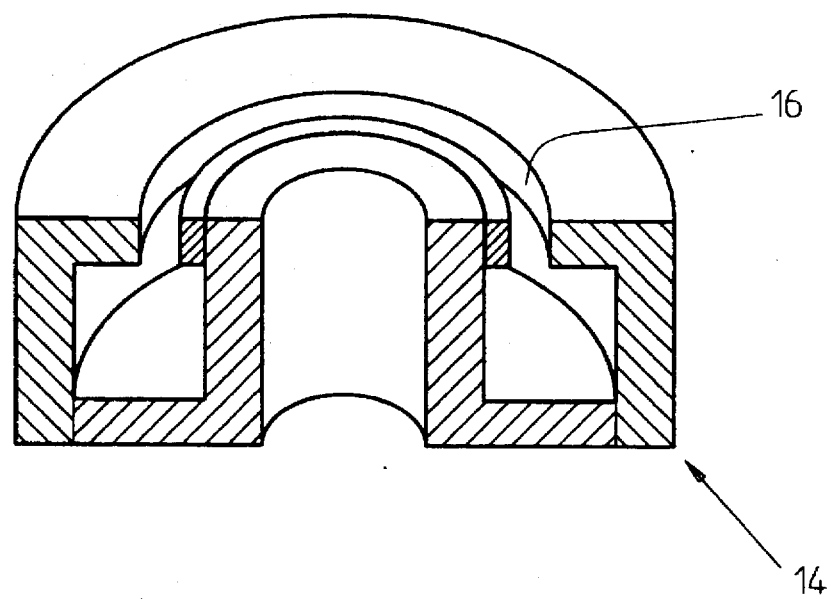
FIG. 4A is a cut-away perspective view of a first alternative stator core structure produced from ferrite.
Figure 4B:
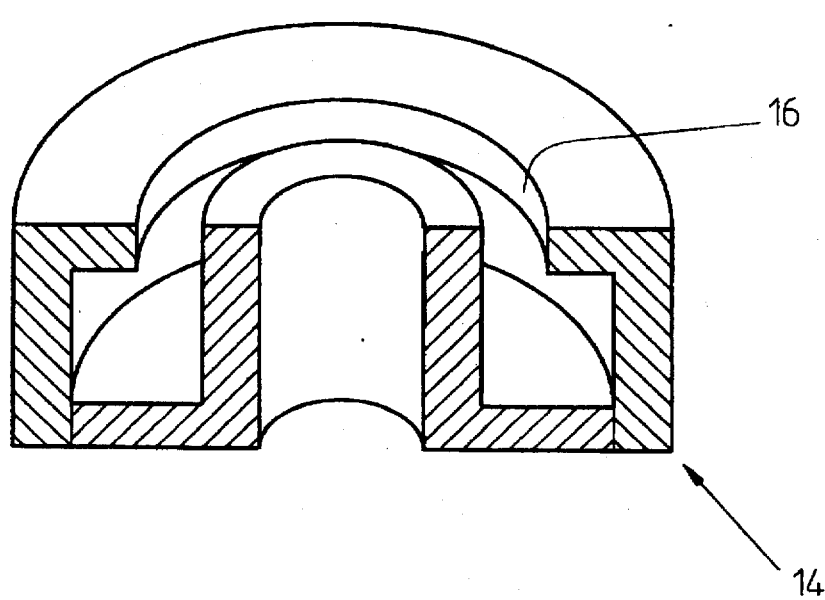
FIG. 4B is a cut-away perspective view of a second alternative stator core structure produced from ferrite.

As an alternative to the laminated stator structure described above, the cores of stator assemblies 14 may be constructed from Ferrite in a manner known in the art. The use of Ferrite for stator assemblies 14 makes possible additional stator structures. For example, stators assemblies 14 may be constructed as a solid of revolution of any of the disclosed stator cross-sections, thereby generating magnetic fields within a region 16 with circular symmetry. In order to facilitate assembly of stator assemblies 14, the ferrite core is typically made from two or more sections which are then fixed together. FIG. 4A shows an example in which a three-piece structure is used. FIG. 4B shows a simplified two-piece construction.

Figure 5A:
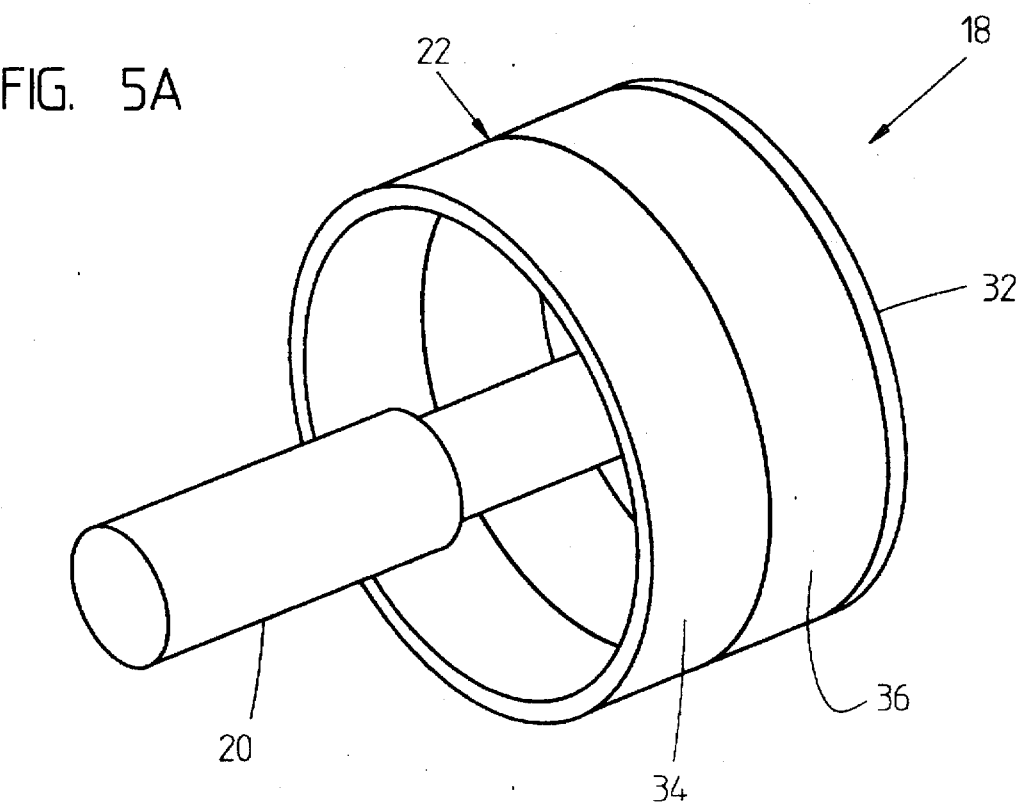
FIG. 5A is a schematic perspective view of a piston-magnet assembly for use in the apparatus of FIG. 1, the assembly including a compound permanent magnet system.
Figure 6A:
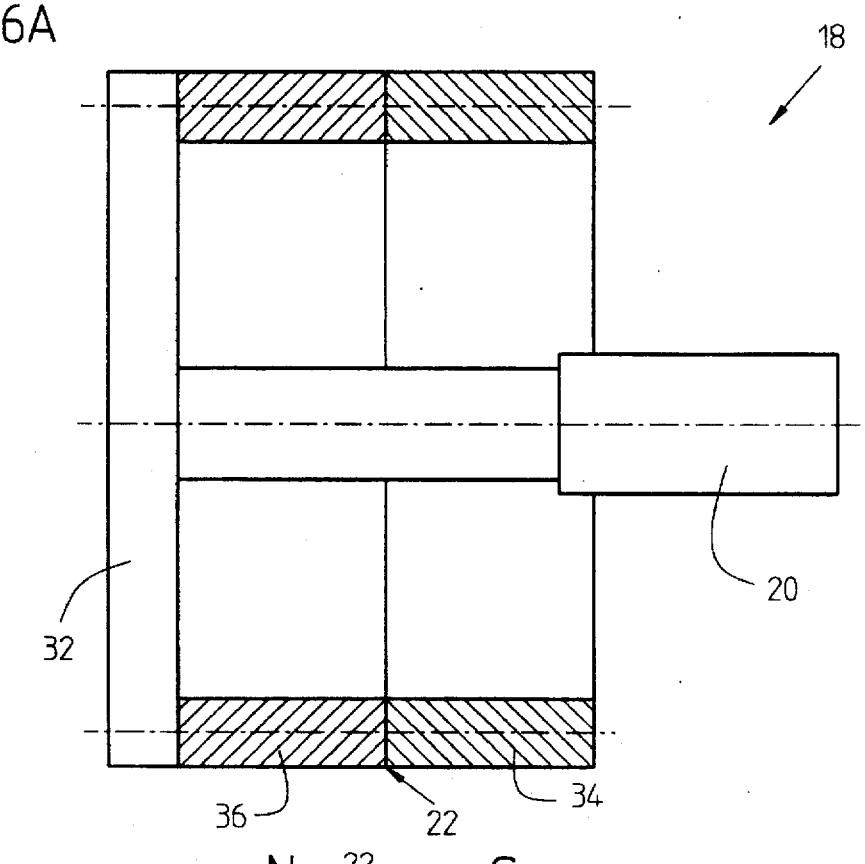
FIG. 6A is a schematic side cross-sectional view through the piston-magnet assembly of FIG. 5A.

Turning now to the features of piston-magnet assembly 18, this is shown most clearly in FIGS. 5A and 6A. Piston-magnet assembly 18 includes piston 20 and compound permanent magnet systems 22 connected through a cap 32.

Piston 20 is preferably machined to match the internal bore of cylinder 12 with a clearance of at least a few μm (typically about 8–30 μm). The material for piston 20 is chosen based on mechanical considerations alone, since the magnetic character of piston 20 is not important. Piston 20 is therefore typically made from a hardened low-friction material. Piston 20 may alternatively be constructed from a soft, light-weight material such as, for example, aluminum, and then coated with appropriate coatings, as is known in the art.

Compound permanent magnet system 22 is made up of a first section 34 magnetized with its direction of magnetization radial relative to the axis of cylinder 12, and a second section 36, adjacent to, and axially displaced from first section 34, magnetized with its direction of magnetization opposite to that of first section 34. First and second sections 34 and 36 are generally produced separately and then attached by any suitable type of bonding.

Figure 5B:
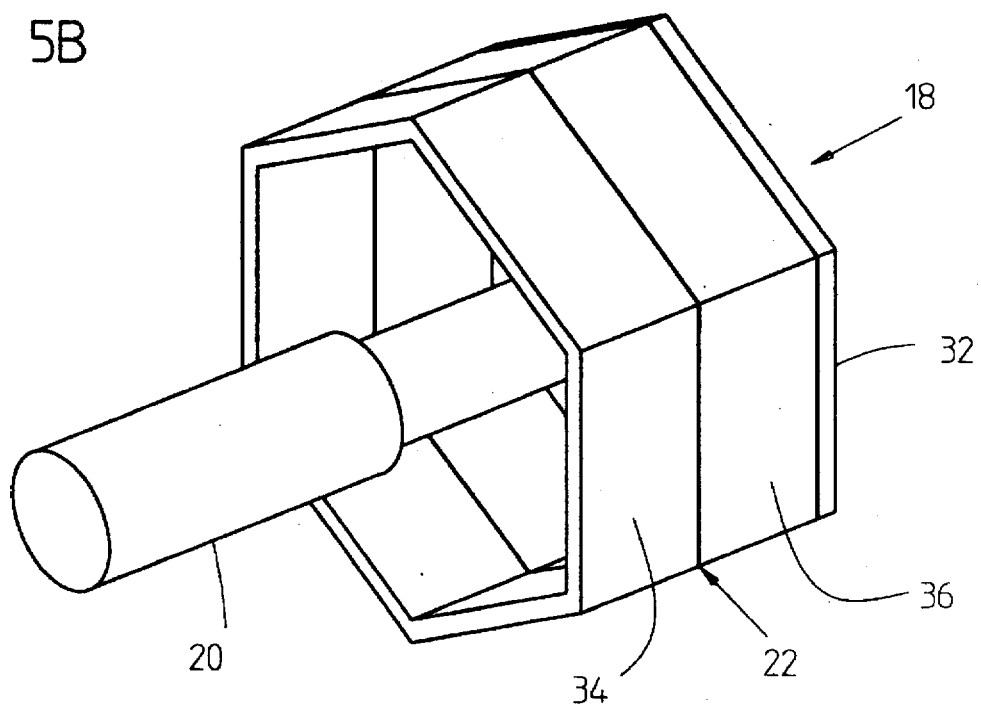
FIG. 5B is a schematic perspective view of an alternative piston-magnet assembly for use in the apparatus of FIG. 1.

In a preferred embodiment, first and second sections 34 and 36 are radially magnetized cylindrical magnets as shown in FIG. 5A. Alternatively, each section may be made up of a number of planar permanent magnets mounted together so as to form a regular polygon as shown in FIG. 5B. In both cases, first and second sections 34 and 36 are closed structures symmetrical about their axis, thereby providing the structural rigidity required for precise alignment. Of course, gap faces 30 and 31 of stator packs 28 are shaped to match the shape of compound permanent magnet system 22 with a clearance of about 0.1–1 mm between compound permanent magnet system 22 and each gap face 30 and 31.

Figure 6B:
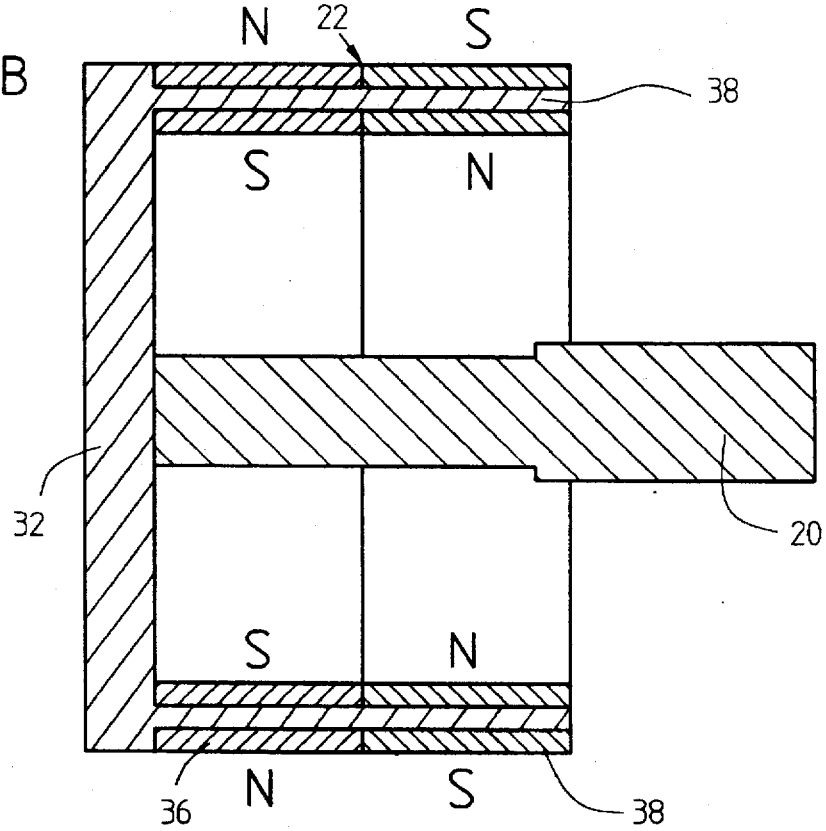
FIG. 6B is a view similar to FIG. 6A showing an alternative compound permanent magnet system structure.

FIG. 6B shows an alternative construction for the piston-magnet assemblies of FIGS. 5A and 5B. In this construction, a layer 38 of magnetically conductive material, integrally formed with cap 32, forms a core on which compound permanent magnet system 22 is constructed. Layer 38 may also be integrally formed with piston 20. First section 34 and second section 36 are each then formed by attachment of suitably magnetized permanent magnets on to the inner and outer faces of layer 38.

The use of layer 38 integrally formed with cap 32 provides additional structural rigidity and help to ensure proper alignment of the magnets with piston 20.

Layer 38 is formed as a hollow tube of a cross-sectional shape matching the required shape of compound permanent magnet system 22. For the form shown in FIG. 5A, the cross-section will be circular, and for the form shown in FIG. 5B, it will be the corresponding polygon.

When compressor 10 is assembled, stator assembly 14 is mounted in fixed relation around cylinder 12 such that it provides a plurality of regions 16 arranged symmetrically near each end of cylinder 12. Piston-magnet assemblies 18 are the positioned at each end of cylinder 12 with pistons 20 inserted within the bore of cylinder 12 and compound permanent magnet systems 22 inserted within regions 16. Inner stops 42 attached to stator packs 28 limit the range of sliding motion of piston-magnet assemblies 18, thereby preventing collision of pistons 20. Compressor 10 generally also features a casing 44 which provides support and rigidity to the entire structure. Outer stops 45, attached to casing 44, prevent piston-magnet assemblies 18 from overshooting outward from their normal range of working positions. Stops 42 and 45 are preferably made of resilient material such as, for example, natural or synthetic rubber.

It is a preferred feature of the present invention that the clearance gaps between gap faces 30, 31 and compound permanent magnet systems 22 are significantly greater, and typically one or two orders of magnitude greater, than the clearance gaps between pistons 20 and the internal bore of cylinder 12. This feature ensures effective pumping operation while protecting the mechanically soft magnetic components of compressor 10 from unnecessary wear. The clearance gaps between gap faces 30, 31 and compound permanent magnet systems 22 should not be increased beyond the extent required for protection from wear since the resultant widening of regions 16 would cause weakening of the magnetic field.

Turning now to the operation of compressor 10, when coils 26 are excited by alternating current, alternating substantially radial magnetic fields are generated within regions 16. As the magnetic field increases in a first direction, the section 34 of compound permanent magnet system 22 which is magnetized in alignment with the field tries to align centrally in the field, and the section 36 which is magnetized in the opposing sense is repelled. The net result of these forces is a purely axial force on each compound permanent magnet system 22 which is transferred through cap 32 to piston 20. When the magnetic field is reversed, the forces are reversed, thereby forcing piston 20 in the opposite direction. Thus, the alternating current supply causes compound permanent magnet systems 22, and hence piston 20, to reciprocate axially.

It should be noted that compressor 10 does not require the springs invariably featured in conventional linear compressors. Due to the opposing-poles structure of compound permanent magnet systems 22, piston-magnet assemblies 18 will naturally tend to a centered resting position in the absence of current in coils 26.

As mentioned above, coils 26 are preferably provided with independent electrical connections with switchable polarity. This feature allows construction of piston-magnet assemblies 18 without requiring unique determination of the polarity of each magnet used. Then, before use of compressor 10, a polarity checking procedure is performed. The polarity checking procedure requires applying a non-alternating (D.C.) voltage across the coils and observing the direction of displacement of both piston-magnet assemblies. If both are drawn inwards towards cylinder 12, or alternatively, both move outwards away from the cylinder, then it is clear that the connection of the coils is correct for the polarity of the magnets. If, on the other hand, one piston-magnet assembly moves inwards and the other outwards, the polarity of one of coils 26 is reversed.

Figure 7:
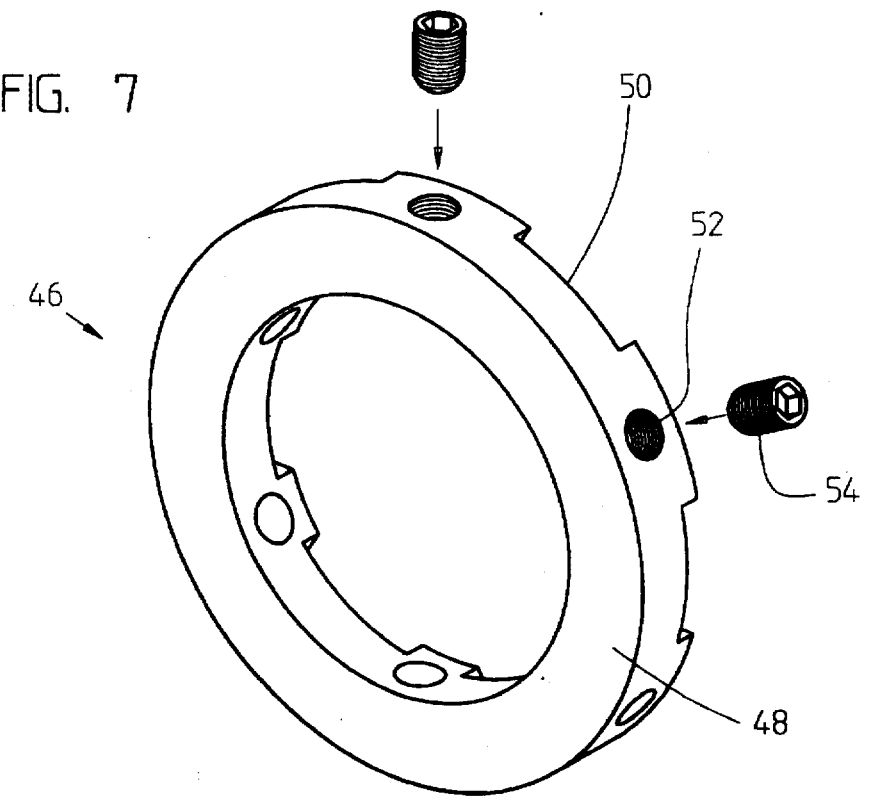
FIG. 7 is a schematic perspective view of a magnetic compensation mechanism for use in the apparatus of FIG. 1.

With reference to FIG. 7, additional preferred features of compressor 10 for compensating for distortions of the magnetic fields will now be described. As mentioned above, variations inherent to the materials from which components of compressor 10 are made, and the tolerances to which they are produced, may cause distortions of symmetry of the magnetic fields generated in regions 16. These distortions may result in slight non-compensated radial forces which would cause additional frictional energy losses, as well as increased wear on piston 20.

It is therefore a preferred feature of the present invention that compressor 10 features a magnetic compensation mechanism for modifying the magnetic fields so as to minimize frictional power losses and vibration in compressor 10 during operation.

FIG. 7 shows an example of a magnetic compensation mechanism, generally designated 46, for modifying the magnetic fields in regions 16. Mechanism 46 includes a collar 48 formed with recesses 50 for engaging parts of stator assemblies 14 (as seen in FIG. 3A) and threaded radial bores 52. A number of inserts 54 made from soft magnetic material are formed as threaded pins which fit radial bores 52. One example of a material suitable for producing inserts 54 is the material commercially available under the tradename "Carpenter 49".

When collar 48 is positioned on stator packs 28 and inserts 54 are located in radial bores 52, the ends of each insert 54 is held near two compound permanent magnet systems 22. In this position, rotation of insert 54 relative to the thread of radial bore 52 causes adjustment of the radial position of insert 54, and hence of its distance from regions 16. The variable proximity of the soft magnetic material of inserts 54 to compound permanent magnet systems 22 may then be used to modify the magnetic field patterns in regions 16 while compressor 10 is in operation until frictional losses and vibration in compressor 10 are minimized.

Practically, an effective method of optimizing the performance of compressor 10 using magnetic compensation mechanism 46 is by adjusting inserts 54 to achieve minimum power consumption. This is done by activating compressor 10 with a given alternating voltage and monitoring the current drawn. Inserts 54 are then adjusted simultaneously, or alternately, until the current is at a global minimum.

As an alternative to the magnetic compensation mechanism described above with reference to FIG. 7, additional windings (not shown) may be located around individual stator packs 28 and be supplied selectively with a D.C. current. A rheostat or other current control device is used to vary the current through the additional windings of one or more of stator packs 28. This has an effect analogous to adjustment of inserts 54 in magnetic compensation mechanism 46, and is used to balance radial forces in a manner similar to that described above.

Figure 9A:
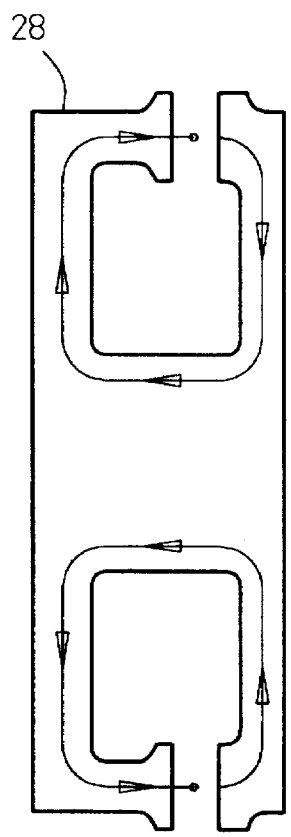
FIG. 9A is a side cross-sectional view through a form of stator core used in the apparatus of FIG. 8.
Figure 9B:
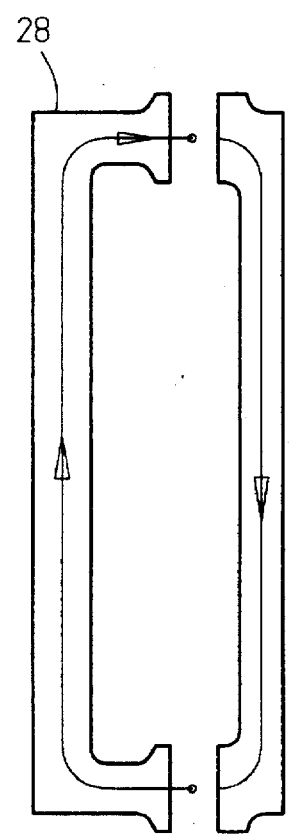
FIG. 9B is a side cross-sectional view through an alternative form of stator core for use in the apparatus of FIG. 8.
Figure 10A:
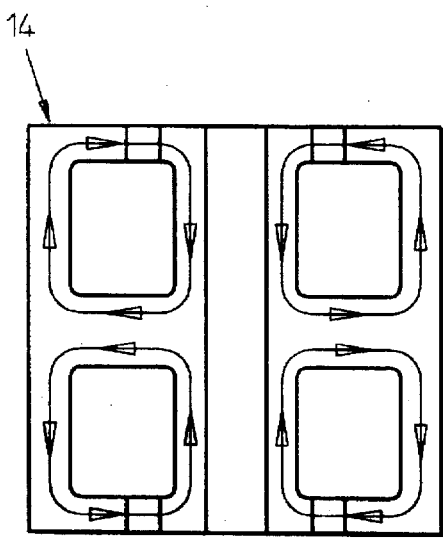
FIGS. 10A and 10B are side cross-sectional views showing the magnetic flux patterns generated by the forms of stator shown in FIGS. 9A and 9B, respectively.
Figure 10B:
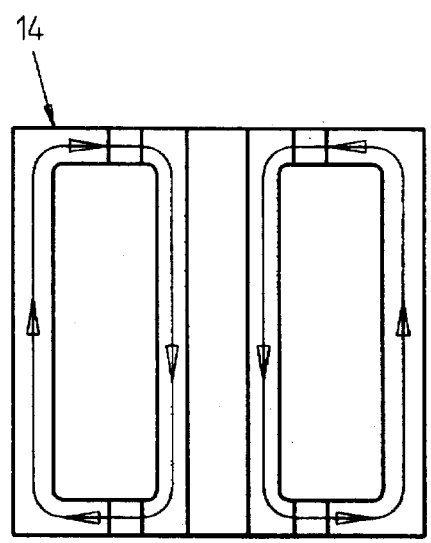

With reference to FIG. 8, a variant form of a compressor, generally designated 56, constructed and operative according to the teachings of the present invention, will now be described. Compressor 56 is generally similar to compressor 10, and equivalent elements are labelled similarly. In this case, stator assemblies 14 are elongated so as to provide the required magnetic fields in regions 16 at both ends of cylinder 12. FIGS. 9A and 9B show two possible forms for stator packs 28 in this embodiment. FIGS. 10A and 10B show the magnetic flux patterns corresponding to the forms of FIGS. 9A and 9B, respectively.

A further difference between compressor 56 and compressor 10 is the provision in compressor 56 of a spring 58. As was described above, piston-magnet assemblies 18 are self-centering without the need for springs. However, in certain circumstances it is preferable to include springs 58, as shown. Springs 58 provide additional biasing of piston-magnet assemblies 18 towards their central position, and increase the stability of the system in sub-resonance conditions.

It should also be noted that a linear bearing 40, not present in compressor 10, is included in compressor 56. Linear bearing 40 helps to maintain the highly precise alignment required between piston-magnet assemblies 18 and cylinder 12. Linear bearing 40 may be attached directly to cylinder 12, or fixed in alignment with it through attachment to stator packs 28 or to another part of compressor 10 which is fixed relative to cylinder 12.

It will be appreciated that the above descriptions are intended only to serve as examples, and that many other embodiments are possible within the spirit and the scope of the present invention.

What is claimed is:

1. A synchronous twin reciprocating piston apparatus comprising:
   (a) a cylinder having a first end, a second end and a central axis;
   (b) at least one stator assembly mounted in fixed relation to said cylinder, said at least one stator assembly being constructed so as to generate a magnetic field in at least two regions, each of said magnetic fields being radial relative to, and symmetrical about, said axis; and
   (c) a pair of piston-magnet assemblies, each piston-magnet assembly including:
      (i) a piston slidable within one of said ends of said cylinder, and
      (ii) at least one compound permanent magnet system located within said regions and associated with said piston, each said compound permanent magnet system including a first section magnetized in a direction radial relative to said axis and a second section axially displaced from said first section magnetized in a direction opposite to said first section, such that, when said at least one stator assembly is activated with an alternating current, said piston-magnet assemblies reciprocate axially relative to said cylinder.

2. The apparatus of claim 1, wherein said pistons generate pulsating pressure in an outlet connected to said cylinder.

3. The apparatus of claim 1, wherein said cylinder has an internal bore, the distance between said piston and said internal bore defining a first gap, the distance between said compound permanent magnet system and said stator defining a second gap, wherein said second gap is significantly greater than said first gap.

4. The apparatus of claim 3, wherein said second gap is at least about ten times greater than said first gap.

5. The apparatus of claim 1, wherein said compound permanent magnet system has a hollow cylindrical form coaxial with said piston.

6. The apparatus of claim 1, wherein said compound permanent magnet system is formed from a plurality of substantially planar magnets mounted together to form a substantially closed polygon.

7. The apparatus of claim 1, wherein said compound permanent magnet system includes:

(a) a layer of magnetically conductive material having an inner surface and an outer surface;

(b) a plurality of permanent magnets attached to said inner surface; and (c) a plurality of permanent magnets attached to said outer surface.

8. The apparatus of claim 7, wherein said layer is integrally formed with said piston.

9. The apparatus of claim 1, further comprising a magnetic compensation mechanism for modifying said magnetic fields so as to minimize frictional energy losses during operation of the apparatus.

10. The apparatus of claim 9, wherein said magnetic compensation mechanism includes at least one piece of soft magnetic material mounted at a variable distance from one of said compound permanent magnet systems.

11. The apparatus of claim 9, wherein said at least one stator assembly includes at least one adjustment coil, said magnetic compensation mechanism including means for selectively activating said at least one adjustment coil.

12. The apparatus of claim 1, wherein said at least one stator assembly includes:

(a) a first coil for generating said magnetic field in a first of said at least two regions;

(b) a second coil for generating said magnetic field in a second of said at least two regions; and (c) at least one connector for connecting an electrical potential across said first and second coils, said at least one connector being switchable so as to reverse selectively the polarity of the electrical potential connected across one of said first and second coils.

* * * * *